United States Patent
Knoska et al.

(10) Patent No.: US 6,978,197 B2
(45) Date of Patent: Dec. 20, 2005

(54) VESSEL MONITORING SYSTEM

(75) Inventors: James J. Knoska, Jensen Beach, FL (US); Melvin I. Dalrymple, Poway, CA (US); Kevin M. Peters, Charlevoix, MI (US)

(73) Assignee: Yacht Watchman International, Inc., Stuart, FL (US)

( * ) Notice: Subject to any disclaimer, the term of this patent is extended or adjusted under 35 U.S.C. 154(b) by 0 days.

(21) Appl. No.: 10/768,756

(22) Filed: Jan. 29, 2004

(65) Prior Publication Data

US 2004/0220711 A1 Nov. 4, 2004

Related U.S. Application Data

(63) Continuation of application No. 09/736,904, filed on Dec. 13, 2000, now Pat. No. 6,687,583.

(60) Provisional application No. 60/170,782, filed on Dec. 15, 1999.

(51) Int. Cl.[7] .......................... G08B 23/00; G06F 17/00
(52) U.S. Cl. ........................ 701/29; 701/33; 340/984; 340/540; 340/539; 340/973; 340/459
(58) Field of Search ............................. 701/29, 33, 36, 701/34, 35; 340/984, 540, 603, 632, 539, 340/980, 995, 987, 461, 438, 973, 459

(56) References Cited

U.S. PATENT DOCUMENTS

| | | | |
|---|---|---|---|
| 3,780,571 A | 12/1973 | Wesener | |
| 4,190,382 A * | 2/1980 | Schmitz et al. | 405/159 |
| 4,593,274 A | 6/1986 | Rizzo | |
| 4,651,157 A | 3/1987 | Gray et al. | |
| 4,894,642 A | 1/1990 | Ashbaugh et al. | |
| 4,998,208 A * | 3/1991 | Buhrow et al. | 702/35 |
| 5,142,473 A | 8/1992 | Davis | |
| 5,214,616 A | 5/1993 | Terhune et al. | |
| 5,367,297 A | 11/1994 | Yokoyama | |
| 5,467,643 A * | 11/1995 | Barnett et al. | 73/116 |
| 5,510,659 A | 4/1996 | Lewis et al. | |
| 5,641,242 A * | 6/1997 | Riviere | 405/3 |
| 5,729,452 A | 3/1998 | Smith et al. | |
| 5,828,969 A | 10/1998 | Chamney et al. | |
| 5,835,871 A | 11/1998 | Smith et al. | |
| 5,844,473 A | 12/1998 | Kaman | |
| 5,852,984 A * | 12/1998 | Matsuyama et al. | 114/222 |
| 6,052,631 A | 4/2000 | Busch et al. | |
| 6,220,194 B1 | 4/2001 | Kjersen | |
| 6,236,322 B1 | 5/2001 | Lopatin et al. | |
| 6,240,365 B1 | 5/2001 | Bunn | |
| 6,259,981 B1 | 7/2001 | Wilcosky | |
| 6,265,879 B1 * | 7/2001 | Landreth | 324/537 |
| 6,317,387 B1 | 11/2001 | D'Arnaddio et al. | |
| 6,347,247 B1 * | 2/2002 | Dev et al. | 607/2 |
| 6,370,454 B1 | 4/2002 | Moore | |
| 6,370,455 B1 | 4/2002 | Larson et al. | |
| 6,397,131 B1 | 5/2002 | Busch et al. | |
| 6,415,207 B1 * | 7/2002 | Jones | 701/1 |
| 6,556,904 B1 * | 4/2003 | Larson et al. | 701/33 |

(Continued)

OTHER PUBLICATIONS newportsystems.com (website) written by Newport Marine System, printed Apr. 5, 2001.

(Continued)

*Primary Examiner*—Olga Hernandez
(74) *Attorney, Agent, or Firm*—Bell, Boyd & Lloyd, LLC

(57) ABSTRACT

The vessel monitoring system of the present invention enables vessel owners to monitor their vessels when they are unable or unavailable to personally do so. The system of the present invention provides an efficient method for inspecting and repairing a designated vessel at periodic intervals and for reporting the results of such inspections and repairs to the vessel's owner in a timely manner for the owner's review and consideration.

6 Claims, 4 Drawing Sheets

U.S. PATENT DOCUMENTS

| | | | | |
|---|---|---|---|---|
| 6,597,973 | B1 * | 7/2003 | Barich et al. | 701/29 |
| 6,633,820 | B2 * | 10/2003 | Bizar | 702/38 |
| 6,822,462 | B1 * | 11/2004 | Staerzl | 324/712 |
| 6,850,173 | B1 * | 2/2005 | Steinbrecher | 340/984 |
| 2001/0033225 | A1 * | 10/2001 | Razavi et al. | 340/425.5 |
| 2002/0082755 | A1 * | 6/2002 | Tanaka | 701/33 |
| 2002/0143445 | A1 * | 10/2002 | Sinex | 701/29 |
| 2003/0158640 | A1 * | 8/2003 | Pillar et al. | 701/33 |

OTHER PUBLICATIONS sureaction.com (website) written by Sure Action Incorporated, printed Apr. 5, 2001.

boatalarm.com written by Flagship Marine Security, printed Apr. 5, 2001.

Outboard Watchman Article written by Motorboating/Boatkeeper, printed May, 2001.

aeris.net (website) written by Aerix.net, printed Jul. 25, 2001.

dock-alert.com written by Dock-Alert.com, printed Jul. 25, 2001.

www.3-tek.com (website) written by 3-Tek, Inc., printed Jul. 27, 2001.

www.motorola.com written by Motorola, printed Jul. 27, 2001.

* cited by examiner

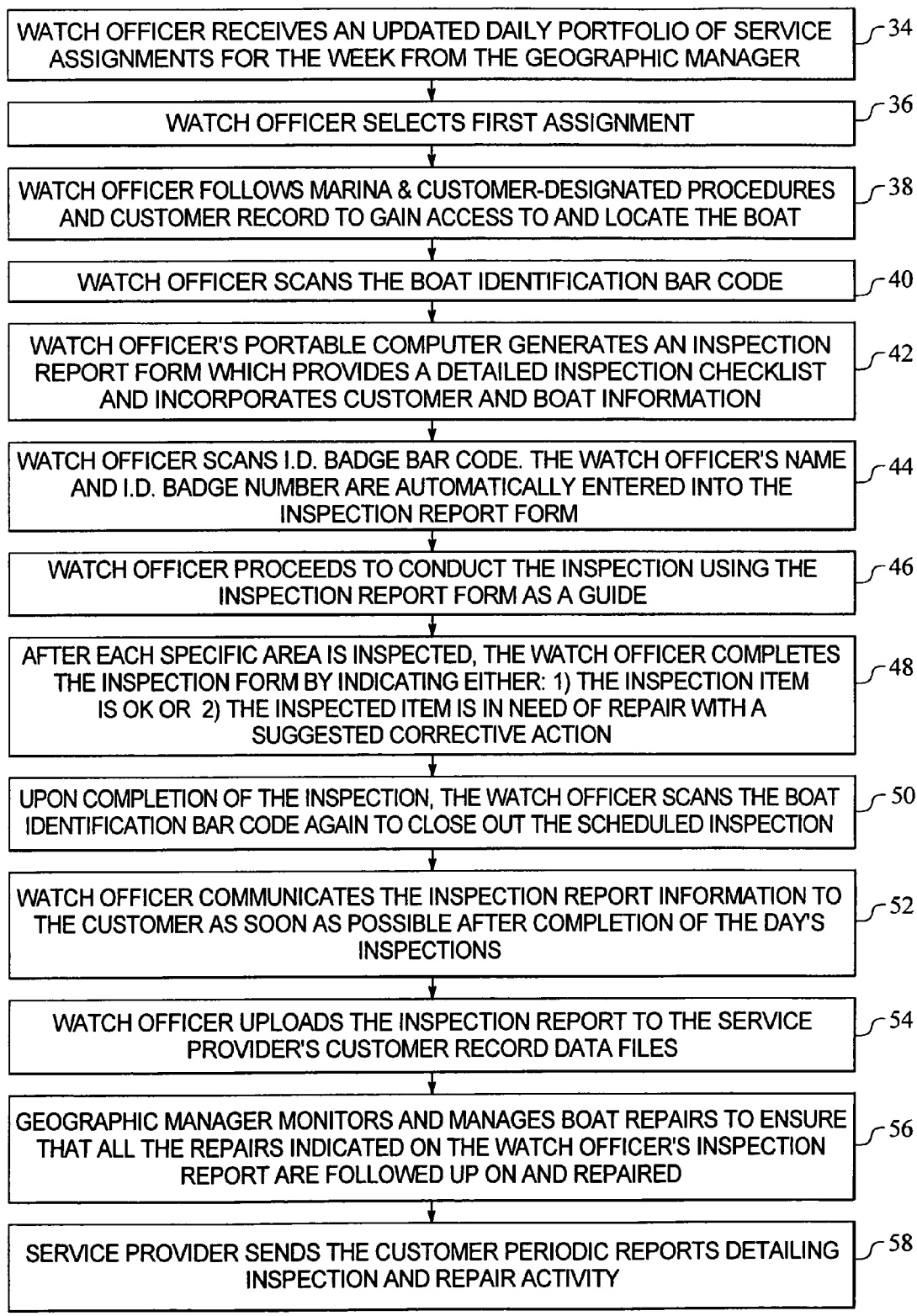

FIG. 3A

Inspection Report - Sample

Owner Information
Name: Jim Sullivan
Address: 3080 Ogden Avenue Suite 100
Minneapolis, MN 12345-9999
(419) 123-3948
jim_msullivan@msn.com

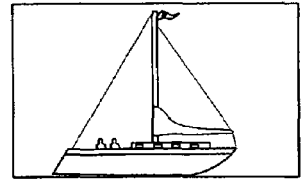

Plan Type: Dockmaster Plan
via fax @ (419) 123-4596

Dockmaster Contact
Name: Bill Watson
Phone: (630) 434-9902
Email: bwatson@yachtwatchman.com

Vessel Inspection
Vessel: The Shining Sentinel
Marina: Bay Harbor
Location: Lot 13-B
Inspected: September 14, 1999 @ 6:15 PM

- Exterior Lines
Dock Lines: ○ Checked
Anchor/Mooring: ○ More Details....
Dockside: ○ Checked
Connection:

- Exterior Electric
Power Cords: ○ Repair Now...
Dockside: ○ Checked
Breaker:

- Exterior Entries
Windows: ○ Repaired...
Doors: ○ Checked
Hatches: ○ Checked
Port Lites: ○ Checked

- Exterior Coverings
Canvas: ○ More Details...

FIG. 3B

Coverings: ◐

Bridge Enclosures: ◐ (N/A)

Bimini Tops:

- Gound Tackle

Davits: ◐

Windlass: ◐

Boat Hooks: ◐

Cleats: ◐

- Comments

Jim, If you order repairs by the end of the week, I'll go ahead and have the boat ready for your vacation next month. I'll keep you posted with weather conditions in the area shortly before you leave. Your next scheduled inspection will be next week. - Bill

VESSEL MONITORING SYSTEM

CROSS-REFERENCE TO RELATED APPLICATION

This application is a continuation of and claims priority from U.S. patent application Ser. No. 09/736,904, filed Dec. 13, 2000, now U.S. Pat. No. 6,687,583 the disclosure of which is incorporated in its entirety herein by reference, and which claims the benefit of U.S. Provisional Patent Application No. 60/170,782, filed Dec. 15, 1999.

DESCRIPTION

The present invention relates in general to a vessel monitoring system, and in particular to a vessel monitoring system which enables vessel owners to monitor their vessels when they are unable or not available to monitor their vessels.

BACKGROUND OF THE INVENTION

Most boat or vessel owners leave their boat, yacht or vessel unattended and unmonitored for significant periods of time while docked or moored. During these time periods, a number of things may happen (e.g., equipment/line failure, faulty through-hull fittings, etc.) that may damage the boat or cause it to sink. Statistics show that for every one boat that sinks at sea, four boats sink at the dock or mooring. The costs to repair a boat that has been under water, even briefly, can be significant. In such situations, the owner of a boat must pay for the repairs not covered by insurance and is deprived of using his or her boat until the boat is repaired.

Moreover, boat owners know these risks are present and are generally concerned about their unattended or unmonitored boats. Some boat owners have people check their boats. However, there is no coordinated system for checking boats, checking certain components of the boat and for regularly reporting the status of the boats to the boat owners. Accordingly, there is a need for an efficient and timely monitoring system that enables vessel owners to monitor their vessels when they are unable or unavailable to do so themselves.

SUMMARY OF THE INVENTION

The vessel monitoring system of the present invention overcomes the above problems by providing a system for conducting thorough, interior and exterior periodic inspections of designated boats, or vessels, for taking immediate corrective action, if necessary, to fix or repair any deficiencies noted during the inspection, and for immediately reporting or making available the results of the inspections and the corrective actions taken, if any, to the boat's owner so he or she stays informed on the current status of his or her boat. The information collected from these inspections and repairs is also preferably used to create historical databases for the boats monitored by the system.

It is therefore an object of the present invention to provide a vessel monitoring system.

Another object of the present invention is to provide a vessel monitoring system that provides the vessel owner information on a vessel's condition.

A further object of the present invention is to provide a vessel monitoring system that immediately repairs or takes corrective action to fix any repairs identified during the detailed inspection of the vessel.

Other objects, features and advantages of the present invention will be apparent from the following detailed disclosure, taken in conjunction with the accompanying sheets of drawings, wherein like numerals refer to like parts, components or steps.

BRIEF DESCRIPTION OF THE DRAWINGS

FIG. 2 is a schematic flowchart of the vessel monitoring process of the vessel monitoring system of present invention; and FIGS. 3A and 3B are a sample inspection report of the vessel monitoring system of present invention.

DETAILED DESCRIPTION OF THE INVENTION

Initiation Process

Figure 1:
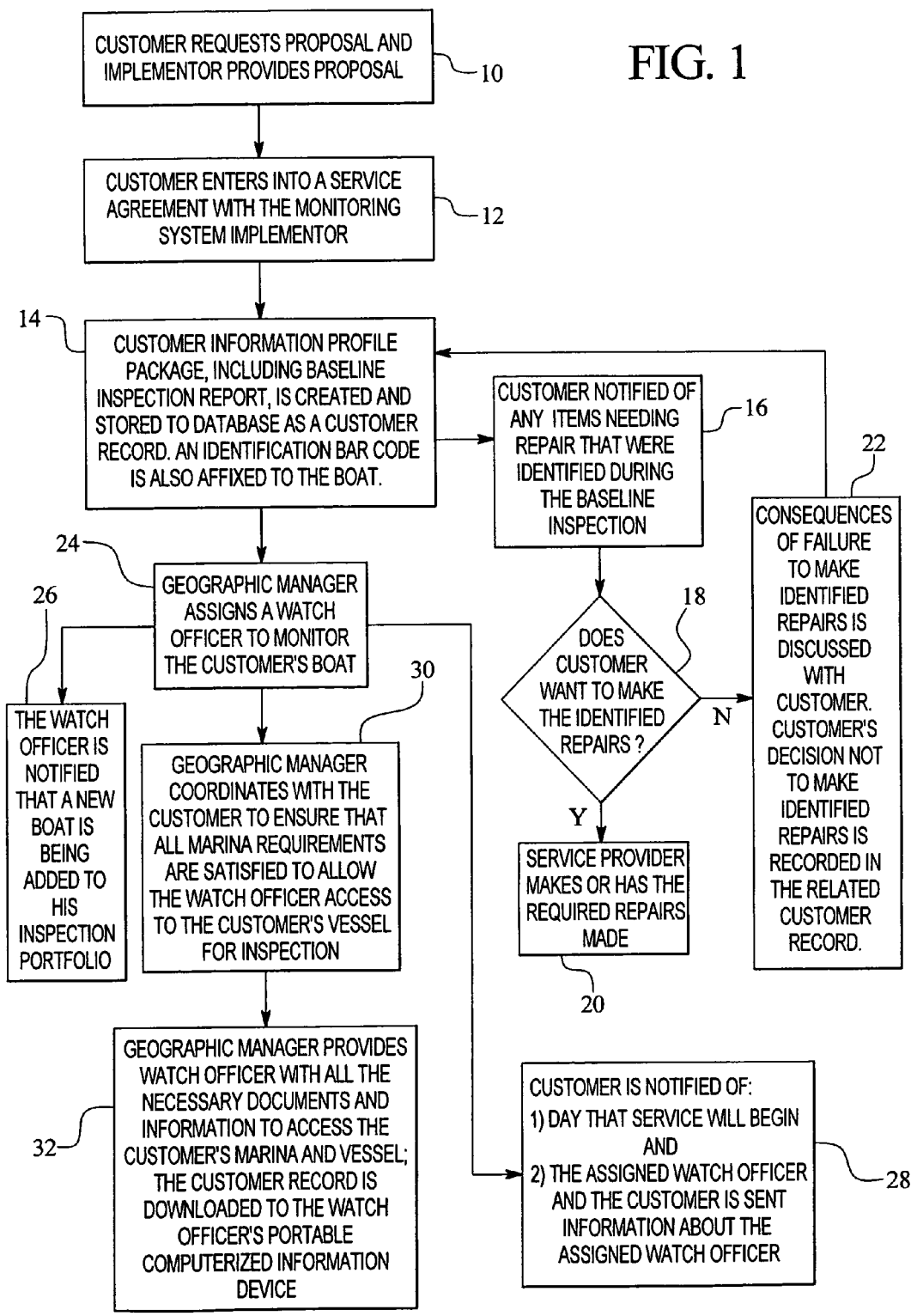
FIG. 1 is a schematic flowchart of the initiation process of the vessel monitoring system of the present invention.

The vessel monitoring system of the present invention is preferably used by a plurality of vessel or boat owners, although it is described herein in relation to one boat or vessel owner. Referring now to the drawings, and particularly to FIG. 1, a vessel or boat owner, referred to herein as the boat owner, vessel owner or customer, establishes an account with an implementor of the vessel monitoring system of the present invention. As indicated by block 10, the customer, usually in response to some form of written or verbal solicitation or advertisement, initiates the process by requesting a monitoring proposal from the implementor. A geographic manager, preferably an employee of the implementor, prepares a monitoring proposal based on information supplied by the customer regarding the customer's vessel or, if deemed necessary, the geographic manager may visit and inspect the boat to prepare a more thorough monitoring proposal. This may be required for relatively large, unique or exceptionally complicated vessels. The implementor or geographic manager provides the monitoring proposal to the customer. The proposal, in addition to all the standard contractual terms required by the implementor, designates the type of monitoring for the designated boat. The monitoring may be customized as desired by the vessel owner or may be a standardized monitoring procedure.

The preferred embodiment of the vessel monitoring system of the present invention includes interior and exterior monitoring procedures, although it should be appreciated that the monitoring procedures could be varied. Generally, the exterior monitoring procedures includes an inspection of the exterior lines of the boat, the exterior electrical equipment, the exterior entries of the boat, the exterior boat coverings and the ground tackle. Generally, the interior monitoring procedures includes an inspection of the boat's interior, the engine room, the boat's bilge pumps, the boat's through-hull fittings and an inspection for oil and fuel leakage. The customer may select the exterior monitoring procedures, or the exterior and interior monitoring procedures.

If the customer accepts the proposal, the customer executes a service agreement with the implementor, as indicated in block 12. The geographic manager, as indicated in block 14, prepares a customer information profile for the boat, assigns a system identification number to the boat and in one embodiment prepares and affixes a bar code or other identifier device with the system identification number to the customer's boat, generally referred to as an identifier. The customer information profile includes details of the monitoring procedures contracted for, a photograph of the boat, the name and official hull identification number ("HIN"), a diagram of the boat and its equipment, a map of the customer's marina where the boat is docked or moored and any other information that the geographic manager considers pertinent for facilitating the monitoring procedures. In the embodiment where a bar code is affixed to the boat, the bar code is preferably a "Dallas" chip-type bar code, and is preferably affixed to the boat in a reasonably accessible location acceptable to the customer and where it is least effected by the elements. It should be appreciated that the system identification number for the boat does not need to be affixed to the boat.

The implementor also conducts a baseline inspection of the boat. The baseline inspection may be conducted by the geographic manager or may be outsourced to a boat inspection professional who conducts the inspection under the supervision of the implementor. The baseline inspection establishes a baseline for the condition of the equipment, features and overall condition of boat as a point of comparison for future inspections and monitoring. The information from the customer information profile created by the geographic manager and the information from the baseline inspection are inputted using a communication device and stored in a conventional computer database or other conventional computer storage medium of the present invention which is maintained by the implementor. Preferably, the communication device is a computer connected to the computer database, although other devices are contemplated such as lap tops or personal digital assistants that communicate with the computer database through a secure internet connection or other data network. It is also contemplated that the implementor could input information using a telephone or cellular phone and voice recognition software. It should also be appreciated that while the present invention is discussed with respect to one implementor, one or more implementors (or watch officers, customers, etc.) may communicate simultaneously with the computer database using one or more communication devices.

Preferably, the conventional computer database is connected to or otherwise communicates with a processor or other controlling device, generally referred to as a controller, as is well known in the art. The stored information about the boat and customer is saved as a customer record on the database which contains all of the information pertinent to the customer and the customer's vessel.

If the implementor identifies any problems with the boat during the baseline inspection, the implementor notifies the customer, as indicated in block 16, and suggests possible repairs to the customer. If the customer wants to make the suggested repairs, upon the instruction of the customer, the implementor may itself or may engage a third party to make the suggested repairs, as indicated by diamond 18 and block 20. If, on the other hand, the customer decides not to make the suggested repairs, the implementor informs the customer of the possible consequences of failing to repair the identified problems. If the customer thereafter does not wish to make the suggested repairs, the customer's decision is recorded in the customer record, as indicated by block 22.

After the initial customer record is created and stored in the database of the vessel monitoring system, the geographic manager assigns a watch officer to monitor the boat as indicated by block 24. The watch officer is preferably an employee of the implementor. The watch officer reports to the geographic manager and is responsible for performing the physical monitoring or inspections of the monitored boats at regular or designated intervals desired by the customer. It should be appreciated that these intervals could be weekly, biweekly, daily or any desired interval requested by the customer. The watch officer is also responsible for preparing the reports resulting from these inspections.

The geographic manager assigns a boat to a specific watch officer based on a number of factors. These include geographical location of the boat, travel time between boats in the watch officer's portfolio, the extent of the monitoring services (including the estimated inspection time), the complexity of the vessel, the watch officer's portfolio size, the watch officer's capabilities and any other factor that bears on properly assigning the monitored boats to the watch officer.

After the geographic manager assigns a specific boat to a specific watch officer, the geographic manager notifies the watch officer of this assignment (i.e., that this boat is added to his or her inspection portfolio), as indicated by block 26 and notifies the customer of this primary assignment. As indicated by block 28, the geographic manager also notifies the customer the day that monitoring of the customer's boat will begin. Along with this notification, the geographic manager provides the customer information about the assigned watch officer. This information includes the watch officer's name, his or her profile, his or her credentials, his or her picture, his or her contact information for enabling the customer to contact the watch officer and any other information deemed pertinent for the customer to know about the watch officer. The geographic manager also inquires as to the customer's preferred method of handling problems if they should arise. The geographic manager inputs and stores this preference in the customer record in the database for future reference and use. It should be appreciated and discussed below, that the geographic manager or implementor could provide this information to the customer via any suitable means, generally referred to as the customer information means, including without limitation, via telephone, facsimile, e-mail or the internet.

The geographic manager also reviews the customer's marina access policies with the customer and ensures that the implementor has all the necessary documentation, materials and authorization for the watch office to access the marina and the customer's boat, as indicated by block 30. This documentation usually includes a vessel insurance certificate indicating the customer's marina and a written consent form, signed by the customer, granting the watch officer access to the marina and the boat. This may also include keys or key cards for access to the marina and the boat. The geographic manager, as indicated in block 32, provides the watch officer with copies of the documentation and materials he or she needs to access the marina and the customer's boat. The watch officer also downloads for future reference the customer's record for the assigned boat from the implementor's database to a suitable input or communication device such as a portable computer or other suitable device (e.g., a personal digital assistant, laptop, phone or cellular phone), preferably via a suitable internet connection with the implementor's secure internet web site.

Monitoring Process

As block 34 indicates, the implementor or geographic manager preferably provides each watch officer with a daily portfolio of monitoring assignments for boats assigned to the watch officer. The geographic manager, preferably with the assistance of conventional scheduling program, takes a number of factors into account when making these daily assignments. The geographic manager factors in the location of the boat, distance between assignments, the watch officer's previously scheduled assignments and any other pertinent factors. Each watch officer preferably downloads his or her daily service assignment portfolio to his or her portable computer, preferably via a secure connection on the internet.

From the daily service assignment portfolio, the watch officer selects his first assignment for the day, as indicated in block 36. Upon arriving at the marina, the watch officer follows all the procedures indicated in the customer record on his portable computer to access the marina and the boat, as indicated by block 38. The geographic manager may accompany the watch officer if this is the watch officer's first inspection of the boat.

Once at the boat, as indicated in block 40, the watch officer uses his or her portable computer to scan the boat identification bar code affixed to the boat. The watch officer's portable computer generates an inspection report form, as indicated by block 42, that guides the watch officer through the required inspection. FIGS. 3A and 3B illustrate an example inspection report form. The generated inspection report form indicates the date and time of the commencement of the inspection. It also incorporates pertinent customer and boat information which is retrieved from the updated customer record stored on the watch officer's portable computer. Such pertinent information may include: (i) the boat owner's name, address and contact information; (ii) the name and type of boat being inspected; (iii) the type of service plan contracted for and marina and docking information. At the beginning of the inspection and at the end of the inspection, the watch officer also scans his identification badge bar code, as indicated by block 44. The portable computer captures the boat identification number and the watch officer's information, such as name and contact information, and incorporates this information into the inspection report form. This enables the implementor, geographic manager and customer, by later accessing this information, to determine the identification of the watch officer who monitored the boat, when the inspection began, when the inspection ended and the results of the inspection. The system also enables the boat owner to respond to questions asked in the inspection report. For example, the boat owner may send a message to the implementor to repair or have repaired a broken item on the vessel.

As indicated by block 46, the watch officer proceeds to inspect the vessel, using the inspection report form as a guide. The areas to inspect listed on the inspection report form will vary depending on the type of monitoring procedure agreed upon by the customer and the implementor. The inspection may focus only on the exterior areas of the vessel or may also focus on the interior areas of the vessel.

The inspection of the exterior of the boat preferably includes:

a. determining how is the vessel sitting in the water;
  b. determining if the vessel is pulling on the starboard side, or is it heavy on the port side (which could indicate that the boat could have water on one side or the other, or one fuel tank could be loaded more than the other);
  c. investigating anything noticeably wrong with the boat;
  d. checking that the exterior lines on both sides of the vessel to ensure they are in the proper perspective (including checking if the stern lines go through cleats on the boat and accounting for tidal waters);
  e. checking the dockside water connections, including the outside water lines coming into the vessel;
  f. checking fenders, including ensuring that all fenders are properly placed to protect the vessel from side damage and raising or lowering to the dock height to account for tidal waters;
  g. inspecting the exterior electrical lines (including making certain that the connection is made properly, that the breakers are set, that the line going into the vessel is equally secured, that the capped line is properly closed to prevent salt water from getting in and causing damage and checking to ensure the electrical lines are out of the water);
  h. checking exterior entries to the vessel to insure that all windows, doors, hatches, port lights, etc. are properly secured;
  i. inspecting canvas and bridge enclosures and glass and plastic window covering to ensure that everything is snapped down and in place, that no areas are exposed, checking the dinghy or a tender boat, ensuring that their coverings are properly enclosed and secured to mountings and checking the bridge enclosure to make sure all snaps, ties and zippers are properly taken care of; and
  j. checking ground tackle to ensure that the davits, the windlass, the anchor windlass, and the anchor, are properly secured with safety chain, and that all boat hooks, gaffs, and other ground tackle are not loose and wandering about the boat.

The inspection of the interior of the boat preferably includes:

a. checking interior electrical, including checking to ensure that all electrical switches are in the "OFF" position (unless the owner wants light left on) and checking light switches to determine if they work;
  b. checking the electrical panel board and other electrical components to ensure that if the vessel is on the proper voltage supply, and checking that the voltage and AMP Meters are registering properly;
  c. checking the engine room, including checking out all hoses for fuel or oil leaks, checking the main engines to ensure there is no water seepage or transmission leaks, observing the filters to ensure that they are not dripping into the bilges, and that no oil spills are occurring, checking the generators to ensure that there are no fuel or oil leaks and that proper oil absorption pads are in place; and checking for any water leaks into the heat exchange cooling systems; and
  d. checking the bilges, including checking the bilges forward, midsection, as well as cockpit or lazarette bilges, checking all pumps' switches are "ON" in the control panel, and that they are on "Automatic" (if the boat owner desires), checking the bilge alarms by lifting the float plate, checking the stuffing, the wax inside the stuffing box, is properly lubricated and checking for oil or fuel leakage.

After inspecting an area required by the inspection report form, the watch officer enters his inspection results, as indicated by block 48. If no discrepancies or items in need of repair are detected, the watch officer enters a "satisfactory" or "checked" comment in his inspection report next to the description of the applicable inspection area. If discrepancies were found or items were found to be in need of repair, the watch officer enters a description of the discrepancy in his inspection report next to the description of the applicable inspection area. The watch officer also describes any corrective action he took to correct a problem (e.g. secure a broken line or missing line holding the boat) or suggests repairs he or she believes the boat owner should take to fix the problem (e.g., replace a faulty boat cover). The watch officer may provide a detailed explanation on the entire inspection and highlight any corrective action he or she took in the comments section at the bottom of the inspection report. When the watch officer completes his inspection, he scans the bar code attached to the boat one more time, as indicated in block 50. The finishing date and time of the inspection are captured and may be incorporated into the inspection report.

The watch officer continues this inspection process for every boat assigned to him on his daily service assignment portfolio. At the end of each day, after all the assigned boats have been inspected, or alternatively after each inspection, the watch officer provides each customer whose boat he or she has inspected a copy of their inspection report, as indicated by block 52. This inspection report is preferably sent to the customer by e-mail, although it may be sent in any other form (e.g., fax or conventional mail) as well. The watch officer also uploads all of his or her inspection reports from the day to the implementor's database. The inspection reports are added to each customer's customer record, as indicated by block 54. Customers may also visit the implementor's secure web site after entering a pre-selected user name and password, to access their boat's inspection, repair and historical information. The geographic manager reviews all of the uploaded reports and flags items that are designated as requiring repair for follow up action, as indicated by block 56. The flagged items are saved to a follow up file which contains a master list of all repairs that need to be completed and a statement of the status of the repairs. The implementor prioritizes these repairs, and the repairs are made in the order of priority. Once a repair is finished, the status of the repair job is changed to "complete," and the repair job is removed from the pending repair job master list.

As indicated by block 58, the implementor provides periodic reports to the customer. At the end of each month, the implementor provides the customer a report detailing the recommended repairs and the action taken on the boat in the last month. At the end of the year, the implementor provides the customer a composite statement listing all the activity for that boat for the year.

While the present invention is described in connection with what is presently considered to be the most practical and preferred embodiments of the present invention, the invention is not limited to the disclosed embodiments. Modifications and variations in the present invention may be made without departing from the novel aspects of this invention.

The invention is hereby claimed as follows:

1. A marine vessel monitoring system comprising:
   a database for storing a plurality of customer records;
   a computer processor for accessing the database, the computer processor adapted to receive inspection data regarding the status of a monitored marine vessel and to store the received inspection data in a customer record associated with the monitored marine vessel, the inspection data including information regarding the status of the exterior of the monitored marine vessel, wherein the monitored marine vessel is floating in water and the information regarding the status of the exterior of the monitored marine vessel includes an indication of how the monitored marine vessel is sitting in the water and
   means for receiving electronic requests to access the inspection data for the monitored marine vessel from the customer records in the database.

2. The marine vessel monitoring system of claim 1, wherein the indication of how the monitored marine vessel is sitting in the water includes an indication of whether the monitored marine vessel is pulling to the left or right.

3. A marine vessel monitoring system comprising:
   a database for storing a plurality of customer records;
   a computer processor for accessing the database, the computer processor adapted to receive inspection data regarding the status of a monitored marine vessel and to store the received inspection data in a customer record associated with the monitored marine vessel, the inspection data including information regarding the status of the exterior of the monitored marine vessel, wherein the information regarding the status of the exterior of the monitored marine vessel includes an indication of whether dockside connections to the monitored marine vessel are intact.

4. The marine vessel monitoring system of claim 3, wherein the dockside connections include at least one of a bow line; a stern line; a dockside water connection; and an external electrical line.

5. A marine vessel monitoring system comprising:
   a database for storing a plurality of customer records;
   a computer processor for accessing the database, the computer processor adapted to receive inspection data regarding the status of a monitored marine vessel and to store the received inspection data in a customer record associated with the monitored marine vessel, the inspection data including information regarding the status of the exterior of the monitored marine vessel, wherein the information regarding the status of the exterior of the monitored marine vessel includes an indication of whether an entry hatch to the monitored marine vessel is secure.

6. A marine vessel monitoring system comprising:
   a database for storing a plurality of customer records;
   a computer processor for accessing the database, the computer processor adapted to receive inspection data regarding the status of a monitored marine vessel and to store the received inspection data in a customer record associated with the monitored marine vessel, the inspection data including information regarding the status of the interior of the monitored marine vessel, wherein the monitored marine vessel includes an engine room and the information regarding the status of the interior of the monitored marine vessel includes an indication of whether the engine room is in proper order.

* * * * *